US012606122B2

(12) United States Patent
Ciurea et al.

(10) Patent No.: US 12,606,122 B2
(45) Date of Patent: Apr. 21, 2026

(54) BELT RETRACTOR

(71) Applicant: ZF AUTOMOTIVE GERMANY GMBH, Alfdorf (DE)

(72) Inventors: Adrian Ciurea, Schwabisch Gmünd (DE); Alexander Stephan, Schwäbisch Gmünd (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 18/997,639

(22) PCT Filed: Jul. 21, 2023

(86) PCT No.: PCT/EP2023/070264
§ 371 (c)(1),
(2) Date: Jan. 22, 2025

(87) PCT Pub. No.: WO2024/022967
PCT Pub. Date: Feb. 1, 2024

(65) Prior Publication Data
US 2026/0034958 A1      Feb. 5, 2026

(30) Foreign Application Priority Data
Jul. 26, 2022     (DE) ..................... 10 2022 118 709.8

(51) Int. Cl.
B60R 22/34          (2006.01)
(52) U.S. Cl.
CPC .................................... B60R 22/34 (2013.01)

(58) Field of Classification Search
CPC .............. B60R 22/34; B60R 2022/287; B60R 22/3413; B60R 2022/3402
(Continued)

(56) References Cited

U.S. PATENT DOCUMENTS

| | | | | |
|---|---|---|---|---|
| 4,172,568 | A | * | 10/1979 | Yamanashi ............. B60R 22/44 |
| | | | | 297/475 |
| 4,529,145 | A | * | 7/1985 | Befort ..................... B60R 22/40 |
| | | | | 242/378.4 |

(Continued)

FOREIGN PATENT DOCUMENTS

| | | |
|---|---|---|
| DE | 202004002806 U1 | 8/2004 |
| DE | 102016001917 A1 | 8/2017 |

OTHER PUBLICATIONS

PCT Search Report for corresponding International Application Serial No. PCT/EP2023/070264, mailed Nov. 3, 2023, pp. 1-4.

*Primary Examiner* — Paul N Dickson
*Assistant Examiner* — Caitlin Anne Miller
(74) *Attorney, Agent, or Firm* — Tarolli, Sundheim, Covell & Tummino LLP

(57) ABSTRACT

The invention relates to a belt retractor (10) for a vehicle seatbelt, comprising a rotatable retractor shaft (14) for a belt reel (16) and bearings (18) disposed at the two axial ends of the retractor shaft (14). One of the bearings (18) has a first cylindrical bearing surface (30) and a second cylindrical bearing surface (32) axially offset against the first bearing surface (30). The bearing (18) is configured so that, when the belt reel (16) is radially loaded, the retractor shaft (14) is supported on the second bearing surface (32) and, in the radially unloaded state of the belt reel (16), the retractor shaft (14) is supported only on the first bearing surface (30).

7 Claims, 1 Drawing Sheet

(58) Field of Classification Search
    USPC ........................................................ 280/807
    See application file for complete search history.

(56)                 References Cited

U.S. PATENT DOCUMENTS

| | | | | |
|---|---|---|---|---|
| 4,620,677 A | * | 11/1986 | Nagao | ...................... B60R 22/44 |
| | | | | 242/385 |
| 5,671,894 A | * | 9/1997 | Dybro | ................ B60R 22/4676 |
| | | | | 242/379.1 |
| 8,967,519 B2 | * | 3/2015 | Tonn | ....................... B60R 22/36 |
| | | | | 242/383.5 |
| 10,723,310 B2 | * | 7/2020 | Wang | ...................... B60R 22/46 |

* cited by examiner

BELT RETRACTOR

RELATED APPLICATIONS

This application is a U.S. National Stage Application filed under 35 USC 371, claiming priority to Serial No. PCT/EP2023/070264, filed on 21 Jul. 2023; which claims priority from DE Patent Application 10 2022 118 709.8, filed 26 Jul. 2022, the entireties of which are hereby incorporated herein by reference.

TECHNICAL FIELD

The invention relates to a belt retractor for a vehicle seatbelt, comprising a housing, a rotatable retractor shaft located in the housing for a belt reel and bearings disposed at both ends of the retractor shaft.

BACKGROUND

In the case of belt retractors, the webbing load results at least temporarily in high radial loads acting upon the retractor shaft. Said high loads promote wear of the bearings, in particular in the radial direction.

SUMMARY

It is an object of the present invention to reduce the wear in the bearings of the retractor shaft of a belt reel.

According to the invention, this object is achieved by a belt retractor for a vehicle seatbelt, comprising a housing, a rotatable retractor shaft located in the housing for a belt reel and bearings disposed at the two axial ends of the retractor shaft, wherein at least one of the bearings has a first cylindrical bearing surface and a second cylindrical bearing surface axially offset against the first bearing surface, the bearing being configured so that, when the belt reel is radially loaded, the retractor shaft is supported on the second bearing surface and, when the belt reel is in a radially unloaded state, the retractor shaft is supported only on the first bearing surface.

The belt retractor according to the invention offers the advantage that, in the case of a radial load, a high proportion of the radial loads are absorbed by the second bearing surface, thereby the first bearing surface being relieved. This means that a major part of the wear that occurs takes place on the more strongly loaded second bearing surface, while only very little wear occurs on the first bearing surface. Consequently, the radial position of the retractor shaft is not or is only slightly influenced by the wear, as the first bearing surface ensures support of the retractor shaft in a defined position.

The bearing is a radial bearing, for example, and the first and second bearing surfaces have different diameters, the second bearing surface being arranged coaxially to the first bearing surface. Thus, the bearing surfaces are formed by stepping which allows them to be removed from the mold in a single component. In this way, the assembly of the belt retractor is facilitated.

The first bearing surface and the second bearing surface are formed in a bearing shell. When assembling the belt retractor, the bearing shell can be easily attached laterally onto the retractor shaft.

The first and/or second bearing surface(s) may include axially extending ribs. The ribs help reduce the contact surface, thereby also the friction of the retractor shaft on the bearing surfaces being reduced.

The retractor shaft can extend along at least one bearing pin which is supported in the bearing. This contributes to a mechanically simple and compact design of the belt retractor.

For example, the bearing pin is formed integrally with a locking washer. This contributes also to a compact design of the belt retractor. In addition, this ensures that also the position of the locking washer toothing formed integrally with the locking washer is not or only slightly influenced by wear on the bearing surfaces. In particular, the position of the locking washer in the load area is maintained below the defined threshold.

According to one embodiment, in the unloaded state of the belt reel, a gap is provided between the bearing pin and the second bearing surface. This means that only when the belt reel is loaded by a radially acting load, will the bearing pin get in contact with the second bearing surface. When, in the case of load, the bearing pin is in contact with the second bearing surface, a lever effect is brought about causing the first bearing surface to be relieved.

BRIEF DESCRIPTION OF THE DRAWINGS

Further advantages and features of the invention will result from the following description and from the attached drawings, wherein:

FIG. 1 shows a longitudinal section across a belt retractor according to the invention in the area of an axial end of the retractor shaft, and FIG. 2 shows a bearing for supporting the retractor shaft.

DESCRIPTION

FIG. 1 illustrates a section across a belt retractor 10 for a vehicle seatbelt comprising a housing 12 in which a rotatable retractor shaft 14 for a belt reel 16 is located.

The webbing is wound onto the belt reel 16.

Bearings 18 are disposed at the two axial ends of the retractor shaft 14, wherein FIG. 1 shows only one of the bearings 18. The second bearing may have an equal design.

The bearing 18 is in the form of a radial bearing.

For example, the bearing 18 is shaped in a bearing shell 20, i.e., integrally with the bearing shell 20.

The bearing shell at the same time forms a lateral housing cover that is attached onto the housing 12.

The bearing shell 20 can be made of synthetic material.

The retractor shaft 14 extends along a bearing pin 22 which is supported in the bearing 18. Concretely, the free end of the retractor shaft 14 is received in the bearing 18.

A conventional automatic blocking system is provided on the side of the housing 12 shown in FIG. 1.

A pawl (not shown) blocks the rotation of the belt reel 16 in the direction of webbing extension in a vehicle-sensitive and/or a webbing-sensitive manner.

In the embodiment, the bearing pin 22 is formed integrally with a locking washer 24.

Further, a locking washer toothing 26 in which a child-safety gearwheel 28 engages is formed on the bearing pin 22.

FIG. 2 illustrates the bearing 18 in a perspective view. As can be seen from FIG. 2, the bearing 18 is bush-shaped.

The bearing 18 includes a first cylindrical bearing surface 30 and a second cylindrical bearing surface 32 axially offset against the first bearing surface.

Concretely, the bearing surfaces 30, 32 are adjacent to each other in the axial direction.

The first bearing surface 30 and the second bearing surface 32 have different diameters, the second bearing surface 32 being arranged coaxially to the first bearing surface 30. In this way, a step 34 is formed between the first bearing surface 30 and the second bearing surface 32. The step may contribute to the axial support of the retractor shaft 14.

Optionally, both the first bearing surface 30 and the second bearing surface 32 have axially extending ribs 36. The contact surface with the bearing pin 22 is reduced by the ribs 36.

In the unloaded state, a gap 38 (see FIG. 1) is present between the bearing pin 22 and the second bearing surface 32.

As shown in FIG. 1, in the radially unloaded state of the belt reel 16, the retractor shaft 14 is only supported on the first bearing surface 30 particularly by means of the bearing pin 22.

However, when a radial load acts upon the belt reel 16, the bearing pin 22 abuts on the second bearing surface 32, thus causing the first bearing surface 30 to be significantly relieved. According to the invention, wear is reduced on the first bearing surface 30 in this way.

The reduced wear guarantees a particularly exact positioning of the retractor shaft 14 during the entire service life of the belt retractor 10. In this way, particularly also an overlap between the locking washer toothing 26 and the child safety gear 28 is maintained.

The invention claimed is:

1. A belt retractor (10) for a vehicle seatbelt, comprising a housing (12),
a rotatable retractor shaft (14) located in the housing (12) for a belt reel (16) and bearings (18) disposed at the two axial ends of the retractor shaft (14), wherein at least one of the bearings (18) includes a first cylindrical bearing surface (30) and a second cylindrical bearing surface (32) axially offset against the first bearing surface (30),
wherein the bearing (18) is configured so that, when the belt reel (16) is radially loaded, the retractor shaft (14) is supported on the second bearing surface (32), and, in the radially unloaded state of the belt reel (16), the retractor shaft (14) is supported only on the first bearing surface (32).

2. The belt retractor (10) according to claim 1, wherein the bearing (18) is a radial bearing, and the first and second bearing surfaces (30, 32) have different diameters, the second bearing surface (32) being arranged coaxially to the first bearing surface (32).

3. The belt retractor (10) according to claim 1, wherein the first bearing surface (30) and the second bearing surface (32) are formed in a bearing shell (20).

4. The belt retractor (10) according to claim 1, wherein the first and/or the second bearing surface(s) (30, 32) has/have axially extending ribs (36).

5. The belt retractor (10) according to claim 1, wherein the retractor shaft (14) extends along at least one bearing pin (22) which is supported in the bearing (18).

6. The belt retractor (10) according to claim 5, wherein the bearing pin (22) is formed integrally with a locking washer (24).

7. The belt retractor (10) according to claim 5, wherein a gap (38) is provided between the bearing pin (22) and the second bearing surface (32) in the unloaded state of the belt reel (16).

* * * * *